(12) United States Patent
Willemstyn

(10) Patent No.: US 6,347,886 B1
(45) Date of Patent: Feb. 19, 2002

(54) DISPOSABLE CONTOURED TANK LINER AND METHOD OF PRODUCTION

(75) Inventor: Benjamin R. Willemstyn, Little Silver, NJ (US)

(73) Assignee: Charter Medical, Ltd., Winston-Salem, NC (US)

( * ) Notice: Subject to any disclaimer, the term of this patent is extended or adjusted under 35 U.S.C. 154(b) by 0 days.

(21) Appl. No.: 09/419,773

(22) Filed: Oct. 18, 1999

(51) Int. Cl.[7] ............................................... B65D 30/18
(52) U.S. Cl. ..................... 383/121; 383/11; 220/495.11
(58) Field of Search ................. 383/104, 121, 383/122, 124, 126, 11, 111; 220/495.11, 495.08

(56) References Cited

U.S. PATENT DOCUMENTS

| | | | |
|---|---|---|---|
| 1,181,506 A | | 5/1916 | Cunningham |
| 1,488,203 A | | 3/1924 | Horne et al. |
| 1,608,901 A | | 4/1926 | Miller |
| 1,948,569 A | * | 2/1934 | Falk ............................ 383/121 |
| 1,951,011 A | * | 3/1934 | Falk ........................ 383/120 X |
| 1,955,385 A | * | 4/1934 | Gray ..................... 220/495.11 |
| 1,959,263 A | * | 5/1934 | Craske ................... 220/495.11 |
| 2,673,024 A | * | 3/1954 | Kuss ........................... 383/121 |
| 3,003,681 A | | 10/1961 | Orsini |
| 3,155,305 A | * | 11/1964 | Bergstrom ................. 383/71 X |
| 3,317,118 A | | 5/1967 | Harrison et al. |
| 4,584,705 A | * | 4/1986 | Myklebust et al. ..... 383/121 X |
| 5,411,165 A | | 5/1995 | Ellis |
| 5,580,173 A | * | 12/1996 | Sebastian ................ 383/120 X |
| 5,684,264 A | | 11/1997 | Cassells et al. |
| 5,699,564 A | * | 12/1997 | Heh .......................... 383/11 X |

FOREIGN PATENT DOCUMENTS

| | | | | |
|---|---|---|---|---|
| FI | 30641 | * | 3/1960 | ................. 383/121 |
| GB | 921752 | * | 3/1963 | ................. 383/122 |

* cited by examiner

*Primary Examiner*—Jes F. Pascua
(74) *Attorney, Agent, or Firm*—Birch, Stewart, Kolasch & Birch, LLP

(57) ABSTRACT

A thermoplastic film tank liner which when containing a liquid has a generally cylindrical configuration. A first flap and a second flap extend from lower portions of a first side wall and have, respectively, a first angular edge and second angular edge. A third flap and a fourth flap extend from lower portions of an opposite side wall and have, respectively, a third angular edge and a fourth angular edge. A first intermediate flap and a second intermediate flap extend, respectively, from the lower portions of the first side wall and the opposite side wall and are positioned, respectively, between the first flap and second flap and the third flap and fourth flap. Each intermediate flap has a transverse portion joined together and, respectively, a first left angular edge and a first right angular edge and an opposite left angular edge and an opposite right angular edge.

36 Claims, 2 Drawing Sheets

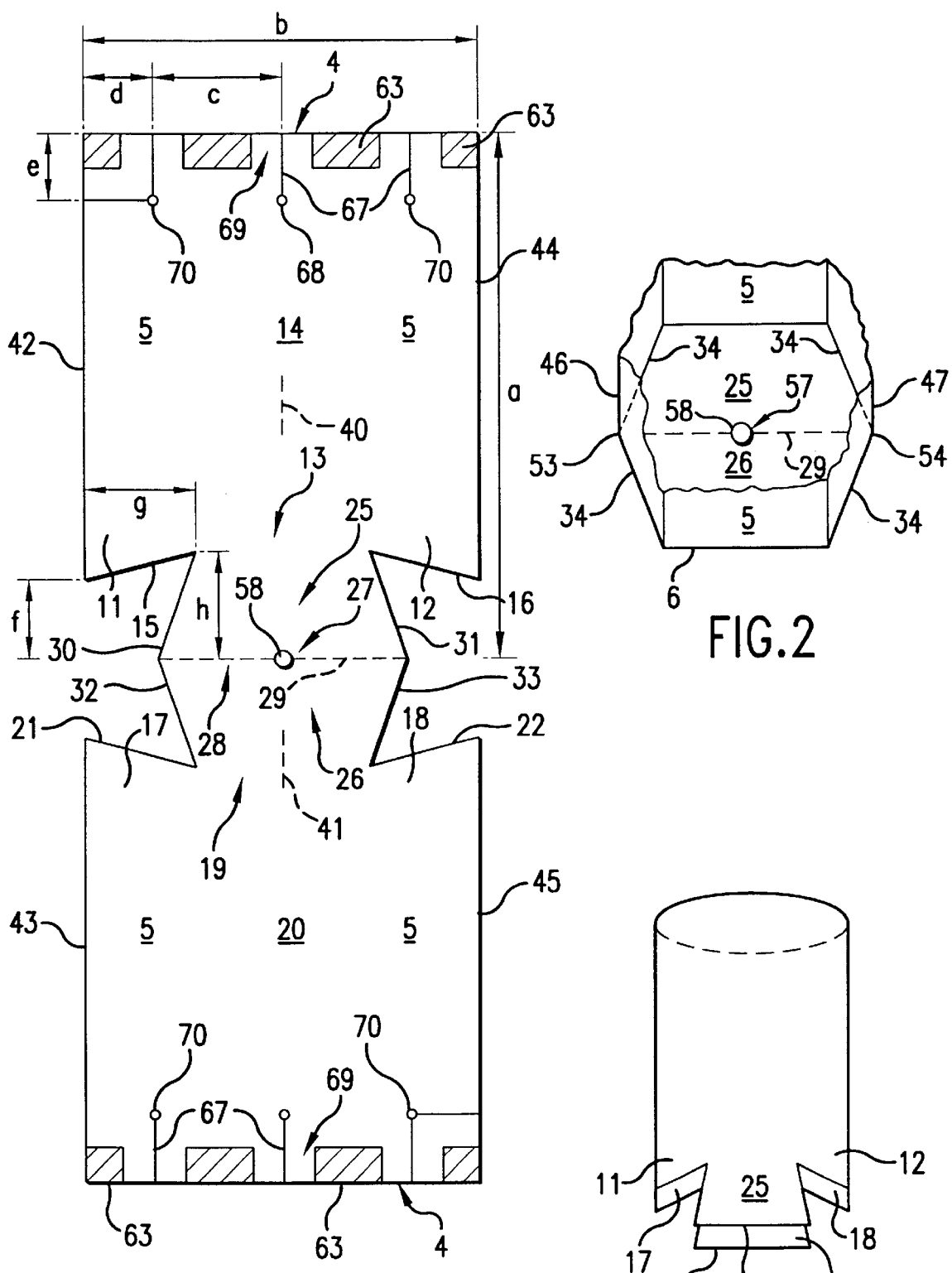

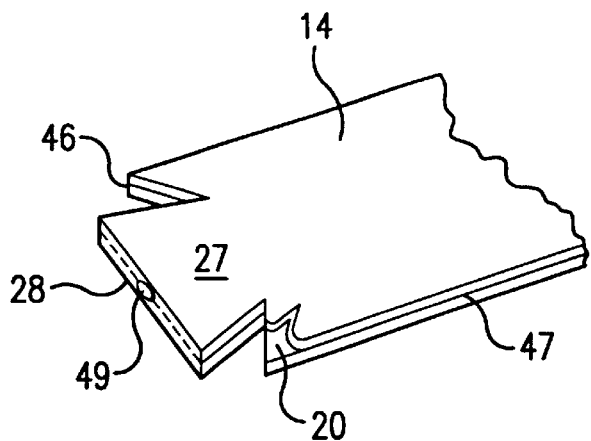
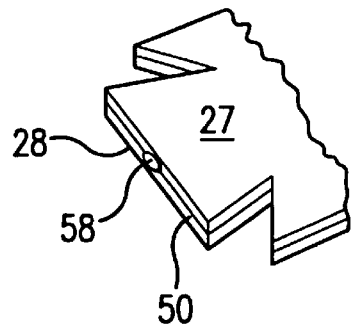
FIG.4   FIG.5
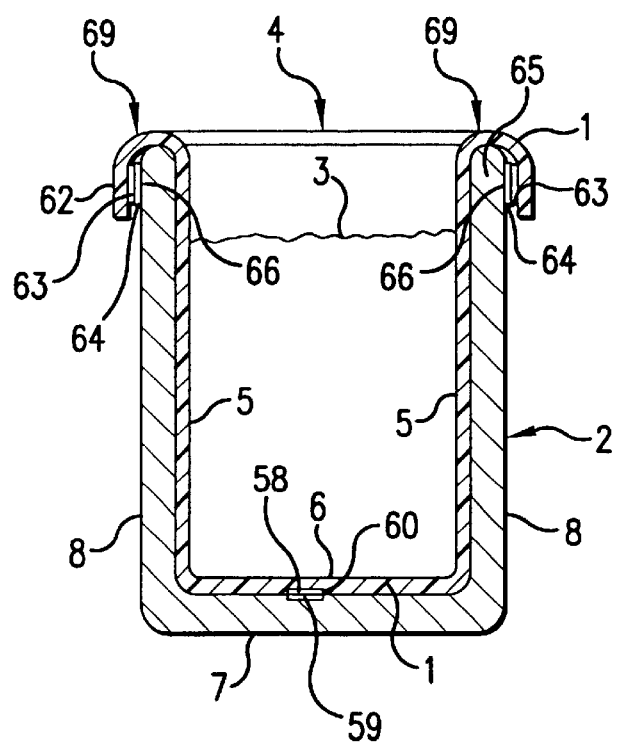
FIG.6

DISPOSABLE CONTOURED TANK LINER AND METHOD OF PRODUCTION

The present invention relates to a contoured tank liner and a method of production of such a liner, and more particularly, it relates to such tank liner and method of production where the base of the tank liner presents a substantially flat surface of approximately circular configuration when the liner is disposed in a tank and contains a fluid. The tank liners of the invention are particularly useful for mixing biologics, since they may be sterilized.

BACKGROUND OF THE INVENTION

Tank liners are well known in the art and are used in many applications. Generally speaking, tank liners are used for lining tanks in which a fluid is disposed and where it is desired that the fluid not contaminate the tank. For example, if a biologic liquid, such as blood, plasma, etc., or a saline solution, which for present purposes is considered as a biologic liquid, is processed in a tank without a liner, after that liquid has been processed and discharged from the tank, the tank must be thoroughly cleaned, under biological standards, before that tank can be reused for processing a further batch of the liquid. However, when a tank liner is used in such a tank, and when that tank liner has been previously sterilized, the liquid can be processed within the tank and tank liner, and after a discharge of the liquid, the tank liner is simply disposed of and a new sterilized tank liner is placed into the tank for subsequent processing of additional liquid.

Thus, tank liners are used in applications where it is less expensive to use a tank liner and avoid the necessary thorough cleaning of the tank, as well as the extensive biological and analytical studies required to prove to regulatory agencies that the tank is clean. As can therefore be easily appreciated, in view of that economic consideration, in order for such disposable tank liner to be commercially acceptable, it must be manufactured at a relatively low cost. Otherwise, it would be more economical to clean the tank after each use.

Accordingly, prior art tank liners, in order to be manufactured at a low cost, are, generally, relatively uncomplicated structures, so as to promote ease of manufacture and, hence, production at a low cost. Typically, such disposable tank liners are made from tubular thermoplastic film.

In one prior art liner, a weld seam is made transverse to the longitudinal direction of the tubular film to form a closed bottom of the film and produce a liner. However, when such liners are disposed in a conventional processing tank, which typically is generally cylindrical and has a generally flat bottom, the welded base bunches against the flat bottom of the tank when the liner contains a fluid, and the base, thus presented, is not flat but exceedingly rough. This rough base causes difficulties in processing and especially in mixing, and most especially in mixing biologics, since it is necessary, for example, that a solid solute be completely dissolved in a solvent to ensure that the concentration of the solute in the solvent is as required. With the rough bottom of such conventional tank liners, as described above, for example, solid solute, such as a saline solute, can settle to the bottom of the liner disposed in the tank before being solubilized, and the rough surface on the base of the liner tends to trap that undissolved solute and prevent that solute from being solubilized by the solvent. When this occurs, either prolonged mixing is required, which is uneconomical, or the solution will not have the desired concentration of solubilized solute therein and is, generally, therefore not acceptable for use.

In addition, the conventional tank liner, as described above, when disposed in a generally cylindrical tank and containing a liquid, not only presents the rough base, due to bunching of the liner at the base, but, in addition, bunches around the side walls of the tank near its base because the base of the liner, being simply welded along its traverse, cannot form a configuration in the tank which approximates a circular configuration of a generally cylindrical tank. This bunching of the liner at the side walls near the base, again, causes a rough surface against which, for example, the solvent must flow during mixing. That rough surface can produce stagnant pockets of the solvent, which can result in inadequate mixing of the solute in the solvent and can produce variations in the concentration of the solute throughout the bulk of the solution. If, for example, the solution is removed from the tank and serially loaded into separate containers, for example, sterile saline bags, then it is possible that the concentration of the solute in those serially filled saline bags will be different, which is quite unacceptable.

In another prior art liner, efforts have been made to avoid the above-described difficulties. This other prior art liner uses, again, a tubular thermoplastic film, but seam welds to an end thereof a circular disc so as to provide a circular bottom to the tank liner. Basically, the disc has a greater diameter than the diameter of the tubular film. A lower edge of the tubular film is bent inwardly to form an inwardly directed "flange" and the disc, with edges extending over the flange and beyond the diameter of the tubular film, is welded, along its circumference, thereto.

However, this approach has a number of disadvantages. Aside from the high cost of tooling and difficulty of manufacture, the inwardly bent flange remains along the inside circumference of the bottom of the finished liner and presents not only a rough surface, as described above, but also presents areas along the circumference which can, for example, trap solute during mixing.

Further, the thermoplastic of choice of the tank liner is a polyolefin, e.g. polyethylene, since that thermoplastic has excellent welding properties. Thus, to make the circular weld, described above, the weld must be between polyolefin surfaces, which means that an outside surface of the liner cannot have a barrier layer film thereon. Normally, tank liners for processing biologics have a polyolefin film bonded to an outside barrier layer film, e.g. a nylon film. This is because polyolefins are permeable, which is most undesirable for biologics since tank contamination can occur. Thus, an impermeable barrier layer film, e.g. nylon film, is required as an outside layer of the thermoplastic film for most biologics processing liners. This nylon outside barrier layer film also greatly increases tear resistance of the liner.

Also, in both of the above-described prior art approaches using tubular thermoplastic film, the diameter, and hence size, of the tank liner is dictated by commercially available diameters of tubular film. This means that the liners cannot be manufactured to snugly fit all usual tanks.

Thus, neither of these prior art tank liners is fully acceptable and, hence, have not been widely used.

As a result of the foregoing, when critical processing is required, e.g. mixing of a solute in a solvent, in biologics, it is not uncommon for manufacturers to dispense with the use of a tank liner, because of the above-described difficulties, and accept the increased cost of production associated with a thorough cleaning and inspection of a tank, accordingly to biologic standards, after each use.

From the above, it can easily be seen that it would be a substantial advantage in the art to provide a disposable tank liner, where the base presents a substantially flat surface, so as to avoid the rough base surface of the prior art and the possibility of difficulties, as described above. It would also be a substantial advantage in the art to provide such a liner with a base which approximates a circular configuration when the liner is disposed in the tank and contains a liquid, so as to avoid the bunching of the liner at the side walls near the base, and the difficulties associated therewith, as described above.

It would also be an advantage to provide such liner which can be made of thermoplastic film having a barrier layer film on all parts thereof and one which does not have a circumferential flange which can trap solute.

SUMMARY OF THE INVENTION

The present invention is based on several primary and subsidiary discoveries.

As a first primary discovery, it was found that it is possible to provide a base for a disposable tank liner, which presents both a substantially flat base surface and one of approximately a circular configuration when the liner is disposed in a generally cylindrical tank and contains a liquid. This is achieved when the base is constructed with six angular flaps depending from side walls of the liner and those flaps are at least in part, joined together by seams. This construction provides a base in a generally hexagon configuration, which will fairly closely approximate a circular configuration when the liner is disposed in a generally cylindrical tank and contains a liquid. This approximate circular configuration avoids bunching of the liner on the side walls of the tank near the base thereof and, likewise, avoids the difficulty of the prior art liners, as described above in that connection.

As a second primary discovery, it was found that when the base is so formed with the six flaps, the liner can be provided with a base having a substantially flat surface, and this avoids the difficulty of the bunched liner base, as described above in connection with conventional liners.

As a third primary discovery, it was found that, with this construction of the base, the liners can be produced at a very low cost and are therefore economically acceptable for disposable use, as opposed to thorough cleaning of a tank after each use thereof, as explained above.

As a subsidiary discovery, it was found that the six angular flaps must have seams between specific of those flaps in order to provide the substantially flat surface and approximately circular configuration.

As another subsidiary discovery, it was found that the present construction of the base, as described above, is applicable to a variety of configurations of the thermoplastic film from which the liner is constructed, therefore making the manufacture of the liner quite convenient and versatile. The liner may be made of a single piece of flat thermoplastic film, or the liner may be made of two superimposed films, or the liner may be made of a single piece of tubular film.

It will also be appreciated from the above that it is potentially possible to form a somewhat flat and somewhat circular configured base with less than six flaps or more than six flaps, but it was found, as a subsidiary discovery, that constructing the base with only four flaps does not sufficiently prevent the bunching of the liner in the tank, as described above, and that eight or more flaps so considerably complicate the construction of the liner that the liner is no longer economical to produce. As a subsidiary discovery in this regard, it was also found that the flaps must be an even number, so that one set of the flaps is formed on one side wall of the liner and another set of the flaps is formed on an opposite side wall of the liner and so that, with such even number of flaps, half of which is disposed on one side wall and half of which is disposed on the opposite side wall, the constructed liner will achieve the approximately circular configuration and flat surface of the base and with an acceptable cost.

Thus, briefly stated, the present invention is an improvement in a thermoplastic film tank liner which, when disposed within a generally cylindrical tank and containing a liquid, has a generally cylindrical configuration. The tank liner has an opened top, side walls and a closed base. The improvement of the invention is wherein the base comprises a first and a second flap extending from lower portions of a first side wall and having, respectively, first and second angular edges. A third and a fourth flap extend from lower portions of an opposite side wall and have, respectively, third and fourth angular edges. A first intermediate flap and a second intermediate flap extend, respectively, from lower portions of the first and opposite side walls and are positioned, respectively, between the first and second flaps and the third and fourth flaps. Each of the intermediate flaps has transition portions joined together and, respectively, first left and first right angular edges and opposite left and opposite right angular edges. A seam is disposed between: (a) the first angular edge and the first left angular edge; (b) the second angular edge and the first right angular edge; (c) the third angular edge and the opposite left angular edge; and (d) the fourth angular edge and the opposite right angular edge. All of the angular edges have angles such that the base presents a substantially flat surface of approximately a circular configuration when the liner is disposed in a tank and contains a liquid.

The invention also provides a method for producing the above-described tank liner. The method comprises cutting from at least one thermoplastic film a first flap and a second flap which extend from lower portions of a first side wall and having, respectively, a first angular edge and second angular edge; cutting from the at least one thermoplastic film a third flap and a fourth flap which extend from lower portions of an opposite side wall and having, respectively, a third angular edge and a fourth angular edge; said cutting being such that a first intermediate flap and a second intermediate flap extend, respectively, from the lower portions of the first side wall and the opposite side wall and are positioned, respectively, between the first flap and second flap and the third flap and fourth flap, and wherein each intermediate flap has transverse portions joinable together and has, respectively, a first left angular edge and a first right angular edge and an opposite left angular edge and an opposite right angular edge; forming a seam between: (a) the first angular edge and the first left angular edge; (b) the second angular edge and the first right angular edge; (c) the third angular edge and the opposite left angular edge; and (d) the fourth angular edge and the opposite right angular edge; and wherein said cutting is such that all of said angular edges have angles such that the base presents a substantially flat surface of approximately a circular configuration when the liner is disposed in said tank and contains a liquid.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a single piece of thermoplastic film appropriately cut for providing the six flaps of the base depending from side walls;

FIG. 2 shows the base assembled with seams, with the upper side walls being cut away for clarity purposes;

FIG. 3 shows a single piece of thermoplastic film, in tubular form, appropriately cut for providing the required six flaps;

FIG. 4 shows two superimposed pieces of thermoplastic film appropriately cut for providing the six flaps;

FIG. 5 is similar to FIG. 4, but instead of two separate pieces of thermoplastic film, FIG. 5 partially shows one piece of thermoplastic film folded at a lowermost edge over itself and appropriately cut to provide the six flaps; and FIG. 6 is a cross-sectional view of the liner disposed in a tank.

DETAILED DESCRIPTION OF PREFERRED EMBODIMENTS

The present liner can be made of any thermoplastic film or combination of films, e.g. polyolefins (polyethylene, polypropylene, etc.), polyvinyl chloride, nylon, etc. However, it is preferred that the liner be made of conventional bioacceptable thermoplastic film, i.e. one having a layer of easily welded thermoplastic, e.g. a polyolefin, and a layer of a barrier plastic, e.g. nylon, and the invention will be described hereinafter in connection with such bioacceptable thermoplastic film, since the use of the present disposable liner has particular application to that environment, especially in that it may be sterilized.

Before considering the details of the present liner, and for a more complete understanding of the invention, reference is first made to FIG. 6, which is a cross-sectional view of a conventional tank with the present liner disposed therein. As shown in FIG. 6, the present tank liner 1 is disposed within a generally cylindrical tank, generally, 2, which, in use, will contain a liquid 3. The tank liner 1 has an opened top, generally, 4, side walls 5, and a closed base 6. Such configuration is common and conventional in the art. However, while the tank 2 is generally cylindrical, conventional such tanks also take other different shapes, such as slightly conical with a more narrow base than an open top. However, these tanks are generally cylindrical in configuration.

As will be noted from FIG. 6, the base 6 of the present liner 1 does not have bunching either at the tank base 7 or the tank lower sidewalls 8.

Turning now to FIG. 1, which shows a plan view of a single piece of thermoplastic film cut in a proper configuration for making the present liner, as can be seen from that figure, there is a first flap 11 and a second flap 12 extending from lower portions, generally, 13 of a first side wall, generally, 14 and having, respectively, a first angular edge 15 and a second angular edge 16. Similarly, there is a third flap 17 and a fourth flap 18 extending from lower portions, generally, 19 of an opposite side wall, generally, 20. Also similarly, the third flap 17 and the fourth flap 18 have, respectively, a third angular edge 21 and a fourth angular edge 22.

A first intermediate flap, generally, 25 and a second intermediate flap, generally, 26 extended, respectively, from the lower portions 13, 19 of the first side wall 14 and the opposite side wall 20. Both intermediate flaps 25, 26 are positioned, respectively, between the first flap 11 and second flap 12 and the third flap 17 and fourth flap 18. Each intermediate flap 25, 26 has transition portions, generally 27, 28, joined or joinable together at a generally central position, indicated in FIG. 1 by dotted line 29. The joining of first and second intermediate flaps 25, 26 is explained in more detail below.

Each of the first intermediate flap 25 and the second intermediate flap 26 have, respectively, a first left angular edge 30 and a first right angular edge 31 and opposite left angular edge 32 and opposite right angular edge 33.

It will be appreciated that the film of FIG. 1 is laid out flat and properly cut for forming the present liner, but is not in the shape of the liner itself. That shape of the liner is achieved by seams between various edges of the flaps, as described in detail below. Thus, there is a seam between the first angular edge 15 and the first left angular edge 30. There is another seam between second angular edge 16 and first right angular edge 31. In addition, there is a seam between third angular edge 21 and opposite left angular edge 32. Finally, there is a seam between fourth angular edge 22 and the opposite right angular edge 33. Such seams 34 are shown in FIG. 2. Also, as can best be seen from FIG. 2, which is a isometric view of the liner with the upper portions of side walls 5 removed for clarity purposes, all of the angular edges have angles such that the base presents a substantially flat surface of approximately a circular configuration, especially when the liner is disposed is a tank, such as tank 1 of FIG. 6, and contains a liquid, such as liquid 3 of FIG. 6. It will also be noted from FIG. 2 that the base is formed from the first and second intermediate flaps 25, 26.

In order to construct the liner from the cut film embodiment shown in FIG. 1, first side wall 14 and opposite side wall 20 are folded along dotted line 27 and the seams, described above, are then placed between the angular edges, as described above. Of course, in the embodiment of FIG. 1, in order to complete the liner, there must also be a seam between sidewall edges 42 and 43 and between side wall edges 44 and 45, i.e. seams 46 and 47 of FIG. 2. In addition, if first side wall 14 and opposite side wall 20 are made of two separate pieces of thermoplastic film, as shown in FIG. 4, then there must be an additional seam 49, as also shown in FIG. 4, along transition portion 27 and transition portion 28 (see FIG. 1) and along dotted line 29 so as to "join" transition portions 27, 28. However, as can be easily appreciated from FIG. 1, the liner can be made from a single piece of thermoplastic film, as shown in FIG. 1, and, therefore, seam 49 (see FIG. 4) is not required, and a simple fold 50 (see FIG. 5) will inherently "join" transition portions 27 and 28.

Alternatively, and as can be appreciated from FIG. 1, by appropriately cutting a single piece of thermoplastic film to the correct configuration, the film may be longitudinally folded over itself along dotted lines 40 and 41 such that side wall edges 42 and 44 and 43 and 45 are in register. Then a seam is placed along these registered edges. This eliminates one of the seams shown in FIG. 2 and, thus, requires only one of the sidewall seams 46 or 47 of FIG. 2.

Further, alternatively, the liner may be made of tubular thermoplastic film, as shown in FIG. 3, where, of course, it will be necessary to have a seam joining together transition portions 27 and 28, but no seams are, accordingly, required for the side walls, since there are no edges 42–45 (see FIG. 1) in tubular film.

However, in the case of the embodiment of FIG. 1 or FIG. 4, which require seams 46, 47 (see FIG. 2), then the first side wall 14 and the opposite side wall 20 will have a seam 46 extending from an outermost portion 53 of the seam 34 (see FIG. 2) between the first angular edge 15 and the third angular edge 21 to at least near the opened top 4 (see FIG. 6) of liner 1. Likewise, in this embodiment, the first side wall 14 and the opposite side wall 20 will have a seam 47 extending from an outermost portion 54 of the seam 34 between the second angular edge 16 and the fourth angular edge 22 to at least near the opened top 4 of the liner 1.

In a preferred embodiment, at an outside center portion, generally, 57 (see FIG. 2) of base 6, there is a base connector 58, which is connectable to a corresponding tank connector 59 (see FIG. 6) disposed on an inside central portion 60 of the tank base 7 so that the liner is centerable within tank 2. Preferably, the base connector 58 and the tank connector 59 are corresponding hook and loop type fasteners, such as Velcro™ pieces, although any other connectors could be used, such as snaps, hooks, links and the like, as well as adhesive pieces. Also, preferably, on an outside portion 62 (see FIG. 6) of the opened top 4 of the tank liner 1, there is at least one liner top connector 63 which is connectable to a corresponding tank top connector 64 disposed near a top portion 65 of an outside surface 66 of tank 2, so that the liner is suspendible from the top portion 65 of the tank 2. Again, preferably, the liner top connector 63 and the tank top connector 64 are corresponding hook and loop type fasteners, such as Velcro™ pieces, although, here again, other attachment means as described above could be used. More preferably, there are a plurality of liner top connectors 63 (see FIG. 1) and plurality of tank top connector 64.

Also, preferably, there is at least one slit 67 (see FIG. 1) which extends from the opened top 4 of the liner 1 towards the base 6 of the liner 1, and the slit 67 terminates at a termination point 68 sufficiently toward the base 6 that a top portion, generally, 69, of tank liner 1 is foldable over the top portion 65 of the tank 2.

More preferably, the termination point 68 has an aperture 70 in the liner 1 and is disposed so as to relieve stress on the liner 1 when folded over the top portion 65 of tank 2.

By using the base connector 58, the tank connector 59, the liner top connector(s) 63 and the tank top connector(s) 64, it can be ensured that the liner is not only centered in the tank but properly aligned within the tank in a vertical direction, so that when a liquid 3 (see FIG. 6) is placed in the tank the liner will expand so as to form essentially a perfect fit within the tank so that no rough surfaces or bunching occurs. The liquid pressure will cause the extendible thermoplastic film of the liner to stretch from the hexagon configuration of the base, as shown in FIG. 2, to a substantially circular configuration, and the liner top connector(s) 63 and tank top connector(s) 64 will ensure that the liner stays properly in place while that movement of the tank liner is occurring. Thus, especially with these preferred embodiments, the base presents a substantially flat surface of approximately a circular configuration when the liner is disposed in the tank and contains a fluid.

The angles used for the angular flaps of the invention, as described above, can vary somewhat, but it is preferred that the angles be chosen such that the base 6, in planar configuration, is a hexagon, for the reasons explained above, and a hexagon with somewhat equal dimensions of each side thereof, although this is not critical, since, as noted above, with the present liner the liquid contained in the liner will cause the extendible plastic film to conform to the inside walls of the tank. FIG. 1 shows dimension lines a through h. These dimensions, in centimeters, for producing a 20-liter capacity tank liner are as follows: a=60; b=44.4; c=14.8; d=7.4; e=7.6; f=8.9; g=12.2; and h=12.2. However, the ratios of these metric dimensions can be converted to any system, e.g. the English units. Likewise, for larger or smaller capacity liners, those ratios would simply be increased or deceased by an appropriate factor for producing larger or smaller capacity liners. The dimensions of FIG. 1 are dimensions for the first side wall 45, but, of course, the dimensions will be the same for the opposite side wall 20.

The seams, described above, can be provided by heat welding, induction welding, infrared welding, or glue or adhesive or even tapes placed on the outside of the liner or the inside of the liner, but it will be appreciated that in this latter regard, the tapes on the inside of the liner will introduce some small roughness to the base 6 of the liner 1, although with thin tapes that will not normally be a significant problem. Glue or adhesive is more labor intensive to apply. Hence, welds are preferred.

The dimensions shown in FIG. 1 will provide sufficient overlap of the angular edges, described above, so that thermowelds, e.g. heat welds, can be applied to the angular flaps for forming the heat welds without any substantial distortion of the hexagonal base or the side walls.

The base connector and the liner top connector(s) can be applied to the liner either by welding or glue or adhesive, and likewise, the tank connector and the tank top connector(s) can be applied to the tank by glue or adhesive and sometimes welding.

Instead of separate liner top connectors 63 and tank top connectors 64, both of those connectors may be in the form of a belt secured around both the top portion 65 of the tank and the outside portion 62 of the liner, so as to provide a continuous connection between the top of the liner and the top of the tank.

Most preferably, the tank liner is made of a composite thermoplastic material, such as conventional laminates of linear low density polyethylene, ethylene vinyl acetate, and other like biocompatible polymers laminated to a non-permeable barrier layer, e.g. nylon, to provide a biocompatible tank liner. With the present liner, the barrier layer is on the outside of the liner at all places of the liner. Thus, the easily weldable layer, e.g. low-density polyethylene layer is on the inside or the liner at all places. Accordingly, when the above-described seams are made by welding, the welding takes place between the easily weldable polyethylene layers, and the difficulty of the prior art tubular film/disc liner is avoided. Further, any remaining edges of a welded seam, will be on the outside of the liner and will not produce an undesired rough surface on the inside of the liner. These composite thermoplastic materials can be sterilized, and hence, the present tank liners can be sterilized by conventional methods to produce a sterilized tank liner for biologic materials.

While the invention as described above is explained in connection with the liner containing a liquid, this term is not to be construed as a continuous material, e.g. water, but may be a discontinuous material, e.g. flowable powdered solids.

Thus, a very advantageous tank liner is provided by the present invention, which extends to the spirit and scope of the annexed claims.

What is claimed is:

1. In a thermoplastic film tank liner which when disposed within a generally cylindrical tank and containing a liquid has a generally cylindrical configuration, said tank liner having an opened top, side walls and a closed base, the improvement wherein the closed base comprises:

(1) a first flap and a second flap extending from lower portions of a first side wall and having, respectively, a first angular edge and second angular edge;

(2) a third flap and a fourth flap extending from lower portions of an opposite side wall and having, respectively, a third angular edge and a fourth angular edge;

(3) a first intermediate flap and a second intermediate flap extending, respectively, from the lower portions of the first side wall and the opposite side wall and positioned, respectively, between the first flap and second flap and the third flap and fourth flap, wherein each intermediate flap has transverse portions joined together and, respectively, first left angular edge and first right angular edge and opposite left angular edge and opposite right angular edge; and (4) a seam between: (a) the first angular edge and the first left angular edge; (b) the second angular edge and the first right angular edge; (c) the third angular edge and the opposite left angular edge; and (d) the fourth angular edge and the opposite right angular edge;

wherein all of said angular edges have angles such that the base presents a substantially flat surface of approximately a circular configuration when the liner is disposed in said tank and contains a liquid, wherein the first side wall and the opposite side wall have a seam extending from an outermost portion of the seam between the first angular edge and the third angular edge to at least near the opened top of the liner, and wherein the first side wall and the opposite side wall have a seam extending from an outermost portion of the seam between the second angular edge and the fourth angular edge to at least near the opened top of the liner.

2. The tank liner of claim 1, wherein the transverse portions of the first intermediate flap and second intermediate flap are joined together by a seam.

3. The tank liner of claim 1, wherein an outside center portion of the base has a base connector which is connectable to a corresponding tank connector disposable at an inside central portion of a tank base so that the liner is centerable within the tank.

4. The tank liner of claim 3, wherein the base connector includes hook or loop fasteners.

5. The tank liner of claim 1, wherein an outside portion of the opened top of the tank liner has at least one liner top connector which is connectable to a corresponding tank top connector disposable near a top portion of an outside surface of the tank so that the liner is suspendible from the top portion of the tank.

6. The tank liner of claim 5, wherein the liner top connector includes hook or loop fasteners.

7. The tank liner of claim 5, wherein there are a plurality of liner top connectors and a plurality of tank top connectors.

8. The tank liner of claim 1, wherein at least one slit extends from the opened top of the liner towards the base of the liner and the slit terminates at a termination point sufficiently toward the base that a top portion of the liner is foldable over a top portion of the tank.

9. The tank liner of claim 8, wherein at the termination point, an aperture in the liner is disposed so as to relive stress on the liner when folded over the top portion of the tank.

10. In a thermoplastic film tank liner which when disposed within a generally cylindrical tank and containing a liquid has a generally cylindrical configuration, said tank liner having an opened top, side walls and a closed base, the improvement wherein the closed base comprises:

(1) a first flap and a second flap extending from lower portions of a first side wall and having, respectively, a first angular edge and second angular edge;

(2) a third flap and a fourth flap extending from lower portions of an opposite side wall and having, respectively, a third angular edge and a fourth angular edge;

(3) a first intermediate flap and a second intermediate flap extending, respectively, from the lower portions of the first side wall and the opposite side wall and positioned, respectively, between the first flap and second flap and the third flap and fourth flap, wherein each intermediate flap has transverse portions joined together and, respectively, first left angular edge and first right angular edge and opposite left angular edge and opposite right angular edge;

(4) a seam between: (a) the first angular edge and the first left angular edge; (b) the second angular edge and the first right angular edge; (c) the third angular edge and the opposite left angular edge; and (d) the fourth angular edge and the opposite right angular edge;

wherein all of said angular edges have angles such that the base presents a substantially flat surface of approximately a circular configuration when the liner is disposed in said tank and contains a liquid; and at least one of a base connector and a liner top connector, if a base connector is provided, an outside center portion of the base has the base connector which is connectable to a corresponding tank connector disposable at an inside central portion of a tank base, so that the liner is centerable within the tank, if a liner top connector is provided, an outside portion of the open top of the tank liner has at least one liner top connector which is connectable to a corresponding tank top connector disposable near a top portion of an outside surface of the tank so that the liner is suspendible from the top portion of the tank.

11. The tank liner of claim 10, wherein the base connector is provided and wherein the base connector includes hook or loop features.

12. The tank liner of claim 10, wherein the liner top connector is provided and wherein the liner top connector includes hook or loop fasteners.

13. The tank liner of claim 10, wherein a plurality of liner top connectors and a plurality of tank top connectors are provided.

14. The tank liner of claim 10, wherein the first side wall and the opposite side wall have a seam extending from an outermost portion of the seam between the first angular edge and the third angular edge to at least near the opened top of the liner.

15. The tank liner of claim 10, wherein the transverse portions of the first intermediate flap and second intermediate flap are joined together by a seam.

16. The tank liner of claim 10, wherein at least one slit extends from the opened top of the liner towards the base of the liner and the slip terminates at a termination point sufficiently toward the base that a top portion of the liner is foldable over a top portion of the tank.

17. The tank liner of claim 16, wherein at the termination point an aperture in the liner is disposed so as to relive stress on the liner when folder over the top portion of the tank.

18. A method for producing in a thermoplastic film tank liner which when disposed within a generally cylindrical tank and containing a liquid has a generally cylindrical configuration, said tank liner having an opened top, side walls and a closed base, the method comprising:

(1) cutting from at least one thermoplastic film a first flap and a second flap which extend from lower portions of a first side wall and having, respectively, a first angular edge and second angular edge;

(2) cutting from the at least one thermoplastic film a third flap and a fourth flap which extend from lower portions of an opposite side wall and having, respectively, a third angular edge and a fourth angular edge, said cutting being such that a first intermediate flap and a second intermediate flap extend, respectively, from the lower portions of the first side wall and the opposite side wall and are positioned, respectively, between the first flap and second flap and the third flap and fourth flap, and wherein each intermediate flap has transverse portions joinable together and has, respectively, a first left angular edge and a first right angular edge and an opposite left angular edge and an opposite right angular edge; and (3) forming a seam between: (a) the first angular edge and the first left angular edge; (b) the second angular edge and the first right angular edge; (c) the third angular edge and the opposite left angular edge; and (d) the fourth angular edge and the opposite right angular edge;

wherein said cutting is such that all of said angular edges have angles such that the base presents a substantially flat surface of approximately a circular configuration when the liner is disposed in said tank and contains a liquid, wherein a seam is formed between the first side wall and the opposite side wall which extends from the outermost portion of the seam between the first angular edge and the third angular edge to at least near the opened top of the liner, and wherein a seam is formed between the first side wall and the opposite side wall which extends from an outermost portion of the seam between the second angular edge and the fourth angular edge to at least near the opened top of the liner.

19. The method of claim 18, wherein a seam is formed between the transverse portions of the first intermediate flap and second intermediate flap.

20. The method of claim 18, wherein a base connector is attached to an outside center portion of the base and a corresponding tank connector is attachable at an inside central portion of a tank base so that the liner is centerable within the tank.

21. The method of claim 20, wherein the base connector includes hook or loop fasteners.

22. The method of claim 18, wherein at least one liner top connector is attached to an outside portion of the opened top of the tank liner and a corresponding tank top connector is attachable to an outside surface of the tank near a top portion so that the liner is suspendible from the top portion of the tank.

23. The method of claim 22, wherein the liner top connector includes hook or loop fasteners.

24. The method of claim 22, wherein there are a plurality of liner top connectors and a plurality of tank top connectors.

25. The method of claim 18, wherein at least one slit is cut from the opened top of the liner towards the base of the liner and the slip terminates at a termination point sufficiently toward the base that a top portion of the liner is foldable over a top portion of the tank.

26. The method of claim 25, wherein at the termination point an aperture is cut in the liner so as to relieve stress on the liner when folded over the top portion of the tank.

27. The method of claim 18, wherein the tank liner is sterilized.

28. A method for producing in a thermoplastic film tank liner which when disposed within a generally cylindrical tank and containing a liquid has a generally cylindrical configuration, said tank liner having an opened top, side walls and a closed base, the method comprising:

(1) cutting from at least one thermoplastic film a first flap and a second flap which extend from lower portions of a first side wall and having, respectively, a first angular edge and second angular edge;

(2) cutting from the at least one thermoplastic film a third flap and a fourth flap which extend from lower portions of an opposite side wall and having, respectively, a third angular edge and a fourth angular edge, said cutting being such that a first intermediate flap and a second intermediate flap extend, respectively, from the lower portions of the first side wall and the opposite side wall and are positioned, respectively, between the first flap and second flap and the third flap and fourth flap, and wherein each intermediate flap has transverse portions joinable together and has, respectively, a first left angular edge and a first right angular edge and an opposite left angular edge and an opposite right angular edge; and (3) forming a seam between: (a) the first angular edge and the first left angular edge; (b) the second angular edge and the first right angular edge; (c) the third angular edge and the opposite left angular edge; and (d) the fourth angular edge and the opposite right angular edge;

wherein said cutting is such that all of said angular edges have angles such that the base presents a substantially flat surface of approximately a circular configuration when the liner is disposed in said tank and contains a liquid, at least one of a base connector and a liner top connector is attached to the tank liner,
  if a base connector is provided, the base connector is attached to an outside center portion of the base and a corresponding tank connector is attachable at an inside central portion of a tank base so that the liner is centerable within the tank, and
  if a liner top connector is provided, at least one liner top connector is attached to an outside portion of the opened top of the tank liner and a corresponding tank top connector is attachable to an outside surface of the tank near a top portion so that the liner is suspendible from the top portion of the tank.

29. The method of claim 28, wherein the base connector is provided and wherein the base connector includes hook or loop fasteners.

30. The method of claim 28, wherein the liner top connector is provided and wherein the liner top connector includes hook or loop fasteners.

31. The method of claim 28, wherein a plurality of liner top connectors and a plurality of top connectors are provided.

32. The method of claim 28, wherein a seam is formed between the first side wall and the opposite side wall which extends from an outermost portion of the seam between the first angular edge and the third angular edge to at least near the opened top of the liner.

33. The method of claim 28, wherein a seam is formed between the transverse portions of the first intermediate flap and second intermediate flap.

34. The method of claim 28, wherein at least one slit is cut from the opened top of the liner towards the base of the liner and the slip terminates at a termination point sufficiently toward the base that a top portion of the liner is foldable over a top portion of the tank.

35. The method of claim 34, wherein at the termination point an aperture is cut in the liner so as to relieve stress on the liner when folded over the top portion of the tank.

36. The method of claim 28, wherein the tank liner is sterilized.

* * * * *